United States Patent [19]
Dubbs et al.

[11] Patent Number: 4,771,980
[45] Date of Patent: Sep. 20, 1988

[54] STAND AND SUPPORT FOR SMALL ENGINES

[76] Inventors: Ronald J. Dubbs; Richard E. Dubbs, both of 3685 Susquehanna Trail, York, Pa. 17404

[21] Appl. No.: 133,121
[22] Filed: Dec. 14, 1987
[51] Int. Cl.[4] ............................................. F16M 3/00
[52] U.S. Cl. ................................... 248/662; 248/130; 248/291; 269/61; 269/71; 269/296
[58] Field of Search ............... 248/662, 660, 670, 676, 248/122, 130, 149, 284, 291, 675, 293; 269/296, 71, 69

[56] References Cited
U.S. PATENT DOCUMENTS

| | | | |
|---|---|---|---|
| 1,283,588 | 11/1918 | Staley | 269/296 X |
| 1,469,734 | 10/1923 | Staley | 269/296 X |
| 2,646,237 | 7/1953 | Hinesman | 248/640 |
| 2,828,096 | 3/1958 | Beri | 248/122 X |
| 2,913,241 | 11/1959 | Miner | 269/59 |
| 3,545,786 | 12/1970 | Yoder | 280/47.24 |
| 4,033,531 | 7/1977 | Levine | 248/676 X |
| 4,461,447 | 7/1984 | Gottlob | 248/676 X |
| 4,511,112 | 4/1985 | Ruehle | 248/676 X |
| 4,512,543 | 4/1985 | Petrick | 248/670 |

Primary Examiner—Ramon O. Ramirez
Attorney, Agent, or Firm—C. Hercus Just

[57] ABSTRACT

A stand or support for various kinds and types of small motors, generators and air compressors while servicing them, as well as testing them under running conditions, the stand or support having a bracket attachable to a bench or vertical post and a simple frame being supported for rotation thereon. The frame comprises an elongated angle iron member to one end of which an engine support is connected fixedly and perpendicularly thereto and a second similar engine support extends perpendicularly from the elongated member and is longitudinally adjustable therealong but is adapted to be clamped at any desired location thereon for attachment of a small engine or the like to the engine supports in accordance with the position of bolt holes on the engine or other type of small device.

9 Claims, 2 Drawing Sheets

STAND AND SUPPORT FOR SMALL ENGINES

BACKGROUND OF THE INVENTION

This invention pertains to a stand or support upon which objects such as small engines, either gas-operated or electric ones, generators, air compressors, or the like may be mounted for repair and servicing, as well as while being run for testing and otherwise. Although gasoline engines, such as those used to propel lawnmowers, some types of washing machines and golf carts, small compressors and generators, are all small, it is inconvenient as well as usually impossible to hold the same in a desired manner in conventional means, such as a mechanic's vice, or similar devices.

It is known that certain types of stands have been devised heretofore for purposes of supporting outboard marine engines for test running and servicing. Typical examples of these are the subject of the following prior U.S. Patents:

U.S. Pat. No. 2,646,237—Hinesman, July 21, 1953
U.S. Pat. No. 2,913,241—Miner, Nov. 17, 1959
U.S. Pat. No. 3,545,786—Yoder, Dec. 8, 1970

One other type of support is known for use with an extractor to be mounted adjacent a sink and is the subject of another U.S. Pat. No. 1,547,283, in the name of Adams, dated July 28, 1925.

The present invention comprises an improvement over these previously devised supports and especially is of a more universal type which adapts it to support a wider range of mechanisms and devices than the subjects of the foregoing patents, and details of which are set forth below.

SUMMARY OF THE INVENTION

It is among the principal objects of the invention to provide a substantially universal type of support for small engines and similar devices to render the same convenient for repair and servicing, as well as testing, the support being small but strong and durable and comprising relatively few parts capable of ready manufacturing and assembly and upon which small motors and the like are supported in a variety of positions best suited for operation thereon by mechanics.

Another object of the invention is to provide a simple frame comprising an elongated angle iron member or arm fixed to rotatable support means, such as a workbench or vertical support, and a pair of similar engine supports are included, one being fixed preferably at one end to one end of the elongated member, while the second is adjustable longitudinally along the elongated member in parallel manner to the first-mentioned support and both members extending perpendicularly from the elongated support.

One further object of the invention is to provide secure clamping mechanism to releasably secure the adjustable engine support to the elongated member and, as an adjunct to this object, the clamping mechanism firmly engages both flanges of the angle iron elongated member and thereby provides both strength and accuracy to the adjustable engine support when secured by the clamping mechanism in adjusted operative position.

Still another object of the invention is to provide means for permitting rotation of the supporting frame about a fixed axis on a bench mount or vertical standard, and especially provide simple but effective locking means to secure the frame in a desired operative position, to which it has been rotated, and also provide supplemental positioning means when the frame has been positioned rotatably so as to prevent accidental rotation of the frame from the desired operative position.

One other object of the invention is to provide similar rows of bolt-receiving holes in the engine support members to enable a wide variety of mechanisms to be bolt-secured thereto.

Details of the foregoing objects and of the invention are set forth in the following specification and are illustrated in the accompanying drawings comprising a part thereof.

BRIEF DESCRIPTION OF THE DRAWINGS

FIG. 1a is a fragmentary perspective view of the upper portion of FIG. 1 but showing the stand in an alternate position in which a motor being operated upon can be disposed.

FIG. 4 is a fragmentary partial view of the support comprising an alternate embodiment of the mounting means by which the support may be attached to a workbench as distinguished from being mounted upon a pedestal, as shown in FIGS. 1, 1a and 2.

DETAILED DESCRIPTION OF THE PREFERRED EMBODIMENTS OF THE INVENTION

The stand and support comprising the present invention primarily is adapted to be used in conjunction with small engines, generators, air compressors and the like. By way of designating exemplary items of this type which can be attached to and accommodated by the stand and support, the latter is adapted to accommodate small items of the described types, having a weight, for example, within the range between twenty and seventy-five pounds, thereby distinguishing the same from automobile engines and other items having weights in excess of seventy-five pounds. For purposes of simplicity, the invention is referred to hereinafter as a stand, but it is to be understood that it also is a support and is adapted not only to have small engines and the like connected thereto while a mechanic is renovating or servicing the same, but also is capable of supporting the item while actually being run for test purposes and otherwise. Further, the term "motor" as used herein, is intended to include not only internal combustion engines or motors, but also electric motors, generators and the like.

Figure 1:
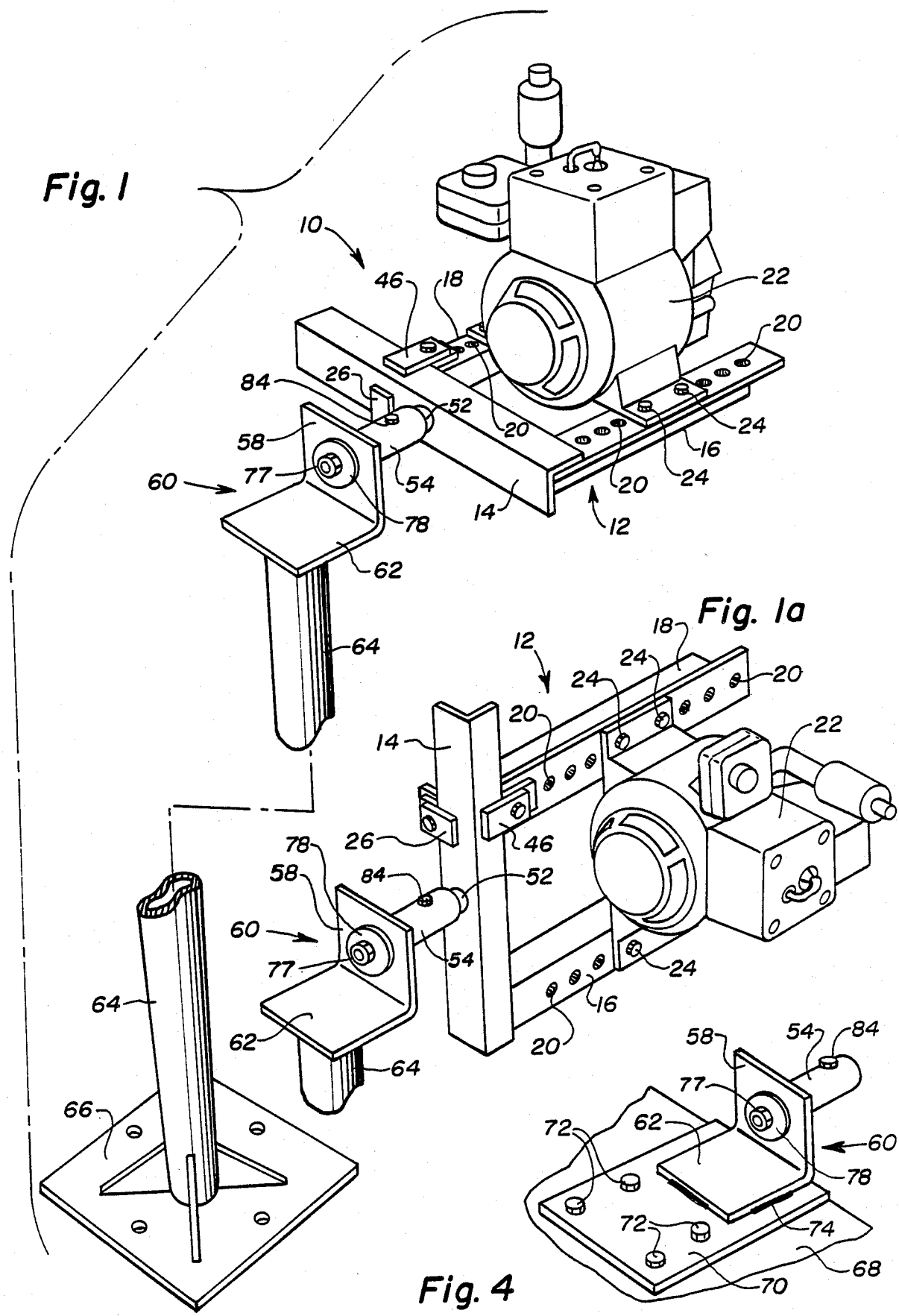
FIG. 1 is an exploded and extended view of the stand and support comprising the invention and showing an exemplary engine connected to the support in one position of operation.

Referring to FIG. 1, which is a somewhat disjointed exploded view of one embodiment of the invention, the stand 10 comprises a frame 12 composed of an elongated member 14, which preferably is a section of angle iron having two conventional flanges disposed at a right angle to each other. A first engine support member 16 also preferably is a section of an angle iron and one end thereof is secured by welding to one end of the elongated member 14. A second engine support member 18 also preferably comprises a section of angle iron material similar to the first engine support member 16. This second engine support member 18 is adjustable at one end upon the elongated member 14 to various positions along said member 14, as shown in solid lines and phantom in FIG. 2, such adjustment preferably always disposing the second member 18 in parallel with the fixed member 16. One flange of both of the first and second engine support members 16 and 18 which are in a common plane are provided with similar series of bolt-receiving holes 20 by which an item such as the exemplary motor or engine 22 may be bolted to the members 16 and 18 by means of bolts 24, shown, for example, in FIGS. 1 and 1a.

Figure 3:
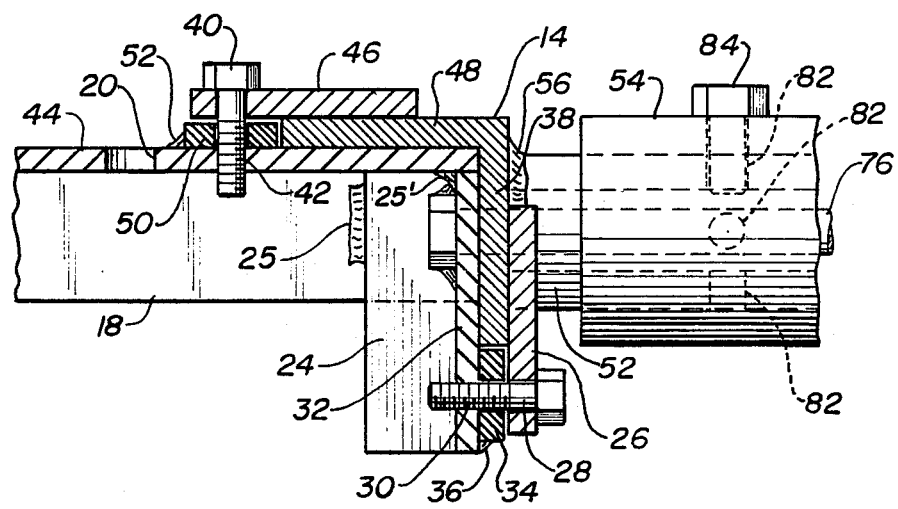
FIG. 3 is an enlarged fragmentary vertical sectional view taken on the line 3—3 of FIG. 2.

One of the principal advantages offered by the present invention comprises the means by which the adjustable support member 18 is clamped to the elongated member 14 and the details of such clamping means preferably are shown in enlarged manner in FIG. 3. Referring thereto, it will be seen that the inner end of member 18, which is that which is connected to elongated member 14, is provided with a short section or strut 24, which extends perpendicularly from the inner surfaces of the right angle flanges of second support member 18 and is fixed thereto by means of weldments 25 and 25'. As viewed in FIG. 3, it will be seen that the strut 24 extends a limited distance below the adjacent edge of second support member 18 for purposes of supporting a clamping leaf or member 26 against the outer surface of the vertical flange of the elongated member 14. One end portion of the leaf 26 has an aperture to receive the shank of clamping bolt 28 which is threaded into a threaded hole 30 in the flange 32 of strut 24, which is fixed to the vertical flange of elongated member 14, as viewed in FIG. 3. A critical aspect of the clamping mechanism thus described comprises a spacing block 34 which is apertured to receive the bolt 28 and is maintained in its operative position by at least a tack weldment 36. The essential feature for the block 34 is that it has a thickness slightly less than that of the vertical flange 38, as viewed in FIG. 3, of elongated member 14. Hence, when the bolt 28 is tightened into the threaded hole 30 of the flange 32 of strut 24, effective clamping of the vertical flange 38 of member 14 is effected. The mechanism thus described comprises one clamping unit of the second support member 18 and the invention comprises a second similar clamping unit described as follows:

As also shown in FIG. 3, a second clamping bolt 40, similar to bolt 28, is threaded into a hole 42 in the horizontal flange 44 of second support member 18. Said bolt extends through a hole in one end of a second clamping leaf 46 which engages the upper or horizontal flange 48 of elongated member 14. A second spacing block 50 also is apertured to receive the bolt 40 and as with regard to the first spacing block 34, the second spacing block 50 is similar to it and has a thickness less than that of the horizontal flange 48 of elongated member 14, whereby when the bolt 40 is tightened, the clamping leaf 46 is tightly clamped against the horizontal flange 48 of elongated member 14, thus augmenting the clamping effect afforded by the clamping leaf 26 when the same has been disposed in clamping position. At least another tack weldment 52 is employed to position the spacing block 50 upon the upper surface of horizontal flange 44 of second support member 18.

The frame 12 which comprises elongated member 14 and the first and second engine support members 16 and 18 is supported in operative position by a pair of telescopically interfitting inner and outer members 52 and 54. Preferably, these are sections of tubular metal stock and the interior diameter of member 54 is just slightly greater than the outer diameter of inner member 52 to permit ease of rotation without wobble. One end of inner member 52 is secured to the vertical flange 38 of elongated member 14 by weldment 56. Similarly, one end of outer member 54 is secured by weldment 56 to flange 58 of a bracket 60, which has another flange 62 connected thereto at a right angle and thus comprising a section of angle iron stock. In accordance with the principles of the invention, the frame 12 may be supported either upon a vertical standard or pedestal 64 and one end thereof has a floor-supported base 66 thereon, or the frame may be supported upon a workbench 68, a fragmentary portion of which is illustrated in FIG. 4. In the pedestal version, flange 62 of the bracket 60 is affixed to the upper end of the vertical standard 64, as shown in FIGS. 1 and 1a. If the frame is to be bench-supported, as shown in FIG. 4, the flange 62 of bracket 60 preferably is supported upon mounting plate 70 which is disposed in flat position upon the workbench 68 and secured by appropriate screws or bolts 72. The plate 70 is of greater area than the flange 62 of bracket 60 and said flange is secured by weldments 74 to the plate 70.

Figure 2:
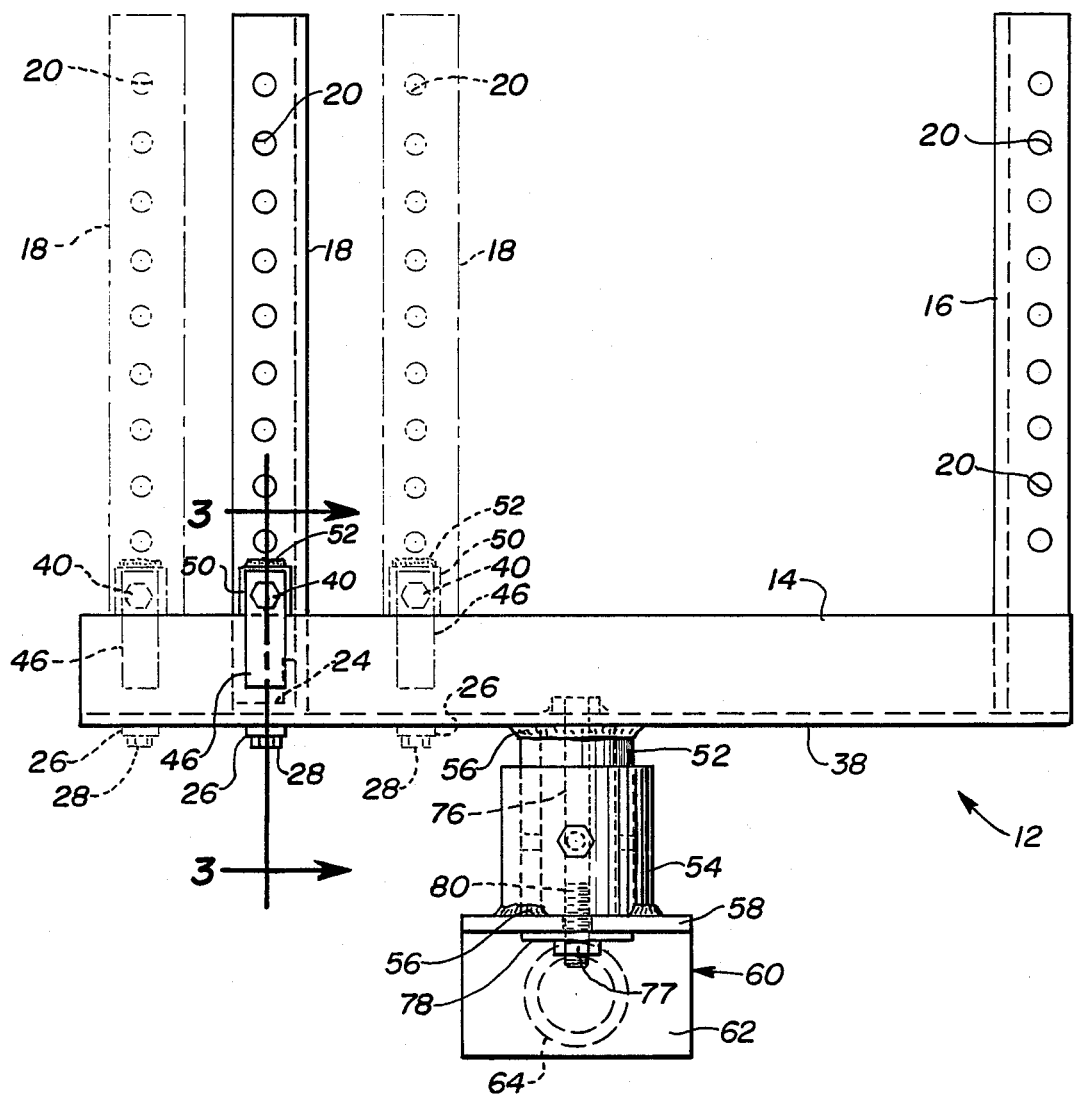
FIG. 2 is a top plan view of the main supporting frame of the stand and illustrating in full lines one position of the adjustable supporting member and, in phantom, showing two alternate positions to which said support member may selectively be moved and clamped therein.

Through the provision of the inner and outer telescopic members 52 and 54, it readily will be seen from the exemplary illustrations of the positions of frame 12 in FIGS. 1 and 1a, that such positions are maintained by additional mechanism comprising a bolt 76, best shown in FIG. 2, one end of which is welded to the outer surface of flange 38 of member 14. The bolt 76 extends axially through both concentric members 52 and 54 and also through a hole in flange 58 of bracket 60 and receives a nut 77 and washer 78, as shown in FIG. 1a to effect firm clamping of member 14 in desired positions. This arrangement of bolt 76 also is for safety purposes in the event any of weldments 56 should break.

For additional safety purposes, after the frame 12 has been disposed at the desired position with the engine 22 or other item clamped to the frame by bolts 24, by referring particularly to FIG. 3, it will be seen that a short-headed pin 84 is extended through an aperture in outer member 54 and into an aligned aperture in inner member 52. Since the inner member 52 is tubular, it has a series of apertures 82 spaced 90° apart in a plane perpendicular to the axis of member 52, as shown in FIG. 3, for the reception of the short-headed pin 84 which extends through a single hole 82 in member 54 and one of the aligned holes in the member 52, thereby positively to prevent relative rotation between said members 52 and 54.

From the foregoing, it will be seen that a relatively simple, but highly effective stand and support for small engines and the like is afforded by the present invention and the variable positioning of the frame with respect to its connection either to a pedestal or a bench is provided by clamping and safety means. In addition, a plurality of clamping members are provided to secure the adjustable engine supports upon the elongated member 14 in parallel relationship to the fixed engine support member, whereby a wide range of items, such as small engines, generators, and other similar units of relatively light weight, may be supported not only while a mechanic is suitably servicing the item, but, in addition, mechanism is sufficiently strong that it readily can support the item while being run for test purposes and the like.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A stand and support for small engines and the like comprising in combination,
   a. a bracket member attachable to a support,
   b. a telescopically interfitting pair of inner and outer relatively rotatable members, one of which is affixed to said bracket member,
   c. an elongated member affixed to the other of said relatively rotatable members intermediately of the ends of said elongated member,
   d. a first engine support member affixed at one end to one end of said elongated member at a right angle thereto,
   e. a second engine support member similar to said first member extending transversely to said elongated member and adjustable at one end longitudinally along said elongated member,
   f. and means on said one end of said second engine supporting member operable to firmly clamp the same at an adjusted position upon said elongated member substantially in parallel relation to said first engine support member.

2. The stand and support according to claim 1 in which said elongated member comprises an angle iron of predetermined length and comprising a pair of flanges disposed at a right angle to each other and said means to clamp said second engine support thereto includes clamping members respectively engaging both flanges of said angle iron.

3. The stand and support according to claim 2 in which said means to clamp said second engine support comprises a short strut extending perpendicularly from the end of said second support which is adjacent said elongated member and said strut abuts and extends beyond one flange thereof a short distance, one surface of said second support and said short strut respectively flatly abutting the inner right angle surfaces of said elongated member selectively for slidable adjustment movement therealong and firm clamping abutment therewith, short flat clamping fingers supported at one end upon the end of said second support and said short strut and respectively abutting the outer right angle surfaces of said elongated member, and clamping bolts respectively extending through said fingers and threaded respectively into said end of the second support and said short strut to tighten said fingers into firm -clamping engagement with the outer surfaces of the right angle elongated member.

4. The stand and support according to claim 3 in which the outer surfaces of said one end of said second support and said short strut are provided with spacing blocks affixed to said surfaces and have a hole to receive said bolts, the thickness of said blocks being slightly less than the thickness of the flanges of said elongated member which are engaged by said fingers to effect firm clamping of said end of said second support to said elongated member.

5. The stand and support according to claim 1 in which said bracket has two flanges at a right angle to each other, one of said flanges being adapted to be affixed to a bench or the like and the other being affixed to one of said telescopic relatively rotatable members and one latter member being tubular.

6. The stand and support according to claim 5 further including means operable to clamp the one of said telescopic members which is connected to said elongated member firmly to said other flange of said bracket, thereby to prevent relative rotation between said tubular members.

7. The stand and support according to claim 5 in which the outer telescopic member is affixed to said other of said flanges and one end of the inner telescopic member extends beyond the outer end of said outer member and is affixed at its outer end to said elongated member, said outer telescopic member having a hole in the uppermost surface when said stand and support is mounted operatively and said inner member having a plurality of similar sized holes to that in said outer member and arranged at desired circumferentially spaced locations to receive a positioning pin or bolt which also extends through said hole in said outer member and thereby prevents relative rotation between said inner and outer members.

8. The stand and support according to claim 5 further including means to secure said relatively rotatable telescopic members against rotation comprising a bolt connected fixedly to the flange of said elongated member to which the end of said inner telescopic member is affixed and said bolt extending through a complementary hole in said flange of said bracket member, and a nut is threaded onto a projecting end of said bolt and abuts the outer surface of said flange to clamp said elongated member and the supports thereon in desired operating position.

9. The stand and support according to claim 1 in which said first and second engine supports are provided with rows of spaced holes arranged to receive bolts to secure an engine or the like to said supports in upstanding or depending manner.

* * * * *